United States Patent
Dotan

(10) Patent No.: US 10,382,446 B2
(45) Date of Patent: Aug. 13, 2019

(54) COMPUTERIZED SYSTEM, METHOD AND COMPUTER PROGRAM PRODUCT, FOR MANAGING A COMPUTER PROGRAM'S OPERATIONS

(71) Applicant: Eyal Dotan, Bussy St Georges (FR)

(72) Inventor: Eyal Dotan, Bussy St Georges (FR)

(73) Assignee: Cameyo Inc., Cary, NC (US)

( * ) Notice: Subject to any disclaimer, the term of this patent is extended or adjusted under 35 U.S.C. 154(b) by 154 days.

(21) Appl. No.: 15/161,971

(22) Filed: May 23, 2016

(65) Prior Publication Data

US 2016/0352750 A1 Dec. 1, 2016
US 2018/0054444 A9 Feb. 22, 2018

Related U.S. Application Data

(60) Provisional application No. 62/167,899, filed on May 29, 2015.

(51) Int. Cl.
  *H04L 29/06* (2006.01)
  *H04L 29/08* (2006.01)

(52) U.S. Cl.
  CPC ........ *H04L 63/102* (2013.01); *H04L 63/0838* (2013.01); *H04L 67/06* (2013.01); *H04L 67/1095* (2013.01); *H04L 67/1097* (2013.01); *H04L 67/141* (2013.01); *H04L 67/34* (2013.01); *H04L 67/42* (2013.01); *H04L 63/10* (2013.01); *H04L 67/1004* (2013.01)

(58) Field of Classification Search
  CPC ....... G06F 21/53; G06F 17/30; H04L 63/045; H04L 67/06; H04L 63/10
  USPC .......................................................... 726/4
  See application file for complete search history.

(56) References Cited

U.S. PATENT DOCUMENTS

| | | | |
|---|---|---|---|
| 6,065,043 A | 5/2000 | Domenikos et al. | |
| 6,185,574 B1 * | 2/2001 | Howard | G06F 16/168 |
| 6,578,055 B1 * | 6/2003 | Hutchison | G06Q 50/24 |
| | | | 714/6.1 |
| 6,918,113 B2 | 7/2005 | Patel et al. | |
| 7,197,638 B1 * | 3/2007 | Grawrock | G06F 21/6218 |
| | | | 705/51 |
| 7,950,026 B1 | 5/2011 | Urbach et al. | |
| 8,434,093 B2 | 4/2013 | Larimore | |

(Continued)

*Primary Examiner* — Bryan F Wright

(74) *Attorney, Agent, or Firm* — Browdy and Neimark, PLLC

(57) ABSTRACT

A computerized method of managing a computer remote session operation, comprising providing a server for hosting application execution; configuring a number of predefined user accounts with low security permissions on said server, where said user accounts are not tied to any specific real user; Whenever a remote user requests to start a remote session, finding an available user account not currently in use on said computer, allocating it for the remote session and marking it as unavailable for subsequent session requests; Generating a one-time password for said user account; Communicating the assigned user account identifier and temporary password to client component on the user's side, either directly or through an intermediate broker, causing the client component to connect to the server using said user account identifier and temporary password; and, upon termination of the remote session, deleting the assigned user account's data and marking it as available again.

22 Claims, 11 Drawing Sheets

(56) References Cited

U.S. PATENT DOCUMENTS

| | | | |
|---|---|---|---|
| 2002/0157089 A1* | 10/2002 | Patel | G06F 8/65 |
| | | | 717/178 |
| 2004/0006706 A1* | 1/2004 | Erlingsson | G06F 21/51 |
| | | | 726/30 |
| 2005/0005018 A1 | 1/2005 | Datta | |
| 2006/0259952 A1 | 11/2006 | Srinivas et al. | |
| 2007/0111726 A1 | 5/2007 | Lambert et al. | |
| 2009/0044170 A1 | 2/2009 | Bernardi et al. | |
| 2009/0106550 A1* | 4/2009 | Mohamed | H04L 63/045 |
| | | | 713/156 |
| 2010/0318992 A1 | 12/2010 | Kushwaha et al. | |
| 2011/0153781 A1 | 6/2011 | Srinivas et al. | |
| 2012/0096365 A1 | 4/2012 | Wilkinson et al. | |
| 2013/0080765 A1 | 3/2013 | Mohanty et al. | |
| 2013/0219050 A1* | 8/2013 | Park | G06F 17/30091 |
| | | | 709/224 |
| 2013/0226876 A1 | 8/2013 | Gati et al. | |
| 2013/0275973 A1* | 10/2013 | Greenfield | G06F 9/44584 |
| | | | 718/1 |
| 2014/0372503 A1* | 12/2014 | Wang | G06F 21/53 |
| | | | 709/201 |

* cited by examiner

COMPUTERIZED SYSTEM, METHOD AND COMPUTER PROGRAM PRODUCT, FOR MANAGING A COMPUTER PROGRAM'S OPERATIONS

RELATED APPLICATIONS

This application claims priority from U.S. Provisional Application Ser. No. 62/167,899, filed by Eyal Dotan on May 29, 2015 and entitled "SCALABLE APPLICATION-AS-A-SERVICE ENVIRONMENT", the content of which is incorporated herein in its entirety by reference.

FIELD

This application relates generally to network-based computing, and more specifically to cloud computing systems and remote software execution.

BACKGROUND

Cloud computing is a delivery model where software and information is provided on demand. One of the latest trends in cloud computing is to run desktop software programs, which were not designed for cloud or mobile devices, on remote servers rather than the local user's computer. In this model, the application requested by the user runs on a remote server, and its graphical output is rendered on the user's machine via a remote client or a browser. Such mechanism is provided by Microsoft RemoteApp and Citrix Receiver among others. However, most software programs running in such remote server environments were designed to deal with traditional file system storage. In today's cloud era, storage is often preferred to be stored on cloud storage servers such as those provided by Dropbox, Google Drive and OneDrive. Traditional and legacy software typically cannot directly work with this kind of storage. For this very reason, the above-mentioned storage providers typically provide a client software that runs on desktop computers and creates a special folder (e.g. named "Dropbox") where traditional software applications can save their files and see them synchronized with the cloud storage. However while this model fits very well personal computers, it is not adapted for remote software execution; it is neither efficient nor safe to install such software and synchronize the entire user's data in remote execution environments where the server is typically at a different location than the user.

When it comes to remote software execution, user storage is one of the shortcomings, and one of the barriers to adoption for this kind of technology, especially in cloud environments. Remote program execution in cloud environments can only be truly useful if users can easily access and modify their own data. For example, using a software such as Photoshop from a distance (remote access client or HTML5 browser) is useless unless you can make it access and modify one's personal files. One additional difficulty in cloud environments is that application sessions may need to be stateless, in which case, typically, storage must not be kept from one session to the next; this may be a requirement both in terms of scalability and server load-balancing. There are different methods for mitigating this problem:

One solution includes duplicating user's data to the remote servers before letting the user's session begin. One example of such technique is known in Microsoft Windows platforms as "roaming profiles". User's data is copied back and forth between a central server and the machine (or machines) where user's applications are about to run. When the user logs in, his files are copied into the machine where his application is meant to run. However this method is proportionally ineffective as the user's data grows bigger, increasing network traffic between the central server and the execution machine. Additionally, the time necessary for the synchronization can be overwhelming, especially in cloud scenarios where machines can be at different geographical locations.

A variant of this method exists, including synchronizing between cloud storage (e.g. Dropbox, Google Drive and OneDrive) and the execution server. Such technique is used for example by Fra.me (formerly Mainframe2). However it bears the same inconveniences as above. Nowadays, Terabytes of cloud storage is becoming a commodity, and synchronizing an entire user storage between geographical cloud locations is consuming both in terms of network traffic (which in itself bears a cost), and in terms of time spent waiting for the synchronization to happen. Additionally, this method bears considerable security risks. Cloud storage providers assure high security for their users' data; copying this whole data to a cloud execution server then becomes the weakest link in securing the user's data, and increases the attack surface for stealing user data.

Moreover, remote application access products such as Microsoft RemoteApp and Citrix Receiver were conceived for company-internal use, with authentication and strong trust relationship between end-users and their server-provider. They were not designed to safely sessions to anonymous or self-registered users, which is often the model for Internet systems and Websites. In today's cloud computing era where software is often required as a service (SaaS), this can considered a shortcoming.

Last, there is a technology called application virtualization which allows transporting applications from one computer to another as simple files, without having to reinstall them. However this kind of products have not yet been leveraged to maximize remote execution efficiently.

SUMMARY

Certain embodiments of the present invention seek to provide an improved method for using software programs in cloud environment together with cloud-based storage.

Certain embodiments of the present invention seek to provide a method for improving the remote usage of computer programs, with little to no trust relationship between the end-user and the application provider. The method typically allows users to access their cloud storage in a transparent way as if the cloud storage were local. Typically, programs can access cloud drive files as if they were stored on the local computer. Typically, remote file listing is simulated to applications, and nothing gets downloaded until the application actually opens a file for reading or writing. Any suitable technique may be employed for leveraging this mechanism for creating cloud environments, e.g. those described herein where external Internet users can interact with computer programs without having a dedicated user account preconfigured on the remote server.

Certain embodiments of the present invention seek to provide an improved method for running traditional computer programs remotely in a cloud, while transparently letting users access and work on their files, with little to none trust relationship required between the end-user and the server provider.

In one embodiment of the present invention, a method is provided for letting users and their applications access remote storage as if it were local data, hence in a way that is compatible with existing software capable of interacting with local file systems. The described method does not cause data to be downloaded until actually needed. For example, if the user's cloud storage data weighs 1 Terabyte but the user only desires to access one 500 KB data file, the process described herein will only generate approximately 500 KB of network traffic, hence lowering network traffic, cost and time to a bare minimum.

Certain embodiments of the present invention secure the data that does get downloaded, and/or remove it after some time.

In another embodiment of the present invention, a method is provided for letting Internet users log on to said remote applications and access their remote storage without pre-configuring the server's operating system account specifically to said users. In other words: dissociating users from the remote server's operating system in a way that is scalable and adapted for external Internet users, where trust relationship needn't be established between the parties.

In yet another embodiment of the present invention, a method is provided for letting Internet users provision their own applications on a remote server and remotely log on to that remote server and use their remote storage, without pre-configuring the server's operating system neither for said users nor for said applications. In other words: dissociating users and their applications from the remote server's system and configuration, while keeping remote sessions completely stateless.

Embodiments include but are not limited to the following, standalone and in any suitable combination e.g. as specifically illustrated and described herein:

[Storage Virtualization Methods and Systems, Stand Alone or in Combination with Other System and Methods Shown and Described Herein, Based on Conventional Technologies and/or in Accordance with any of the Following Embodiments Numbered 1 Onward:]

1. A computerized method of managing a computer program's operations, comprising:
    Defining an arbitrary directory path on the local computer;
    Causing file enumeration operation requests sent from the controlled program to the computer's operating system to be intercepted;
    Whenever a file enumeration operation request is intercepted, checking whether the enumeration is targeted at said arbitrary directory path or a subdirectory thereof. If it is, then:
        Initiating a file enumeration request on a remote storage;
        Returning to the calling program the result of the remote enumeration operation;
2. The method of embodiment 1, wherein whenever a file enumeration operation request is targeted at the direct parent of said arbitrary directory path, then forwarding the request to the operating system and modifying the returned data so as to add the name of the arbitrary directory to the list.
3. The method of embodiment 1, wherein file information is cached, and wherein subsequent enumeration requests on the same path are retrieved from the cache without initiating another remote access request.
4. The method of embodiment 1, further causing file open operation requests sent from the controlled program to the computer's operating system to be intercepted, and
    Whenever a file open operation request is intercepted, checking whether the opening is targeted at said arbitrary directory path or a subdirectory thereof. If it is, then:
        Initiating a file download request from a remote storage;
        Returning to the calling program the contents the locally-downloaded file;
5. The method of embodiment 4, wherein the remote file is downloaded to a local directory and the file open operation request is modified to point to the local copy of the file, and then forwarded to the operating system.
6. The method of embodiment 5, wherein the local copy of the downloaded file is monitored for changes, and wherein whenever a change is detected, duplicating that change back on the remote storage.
7. The method of embodiment 5, wherein downloaded file is automatically deleted from local storage after some time.
8. The method of embodiment 5, wherein the downloaded file is saved in encrypted form.
9. The method of embodiment 8, further causing file read operation requests sent from the controlled program to the computer's operating system to be intercepted, and
    Whenever a file read operation request is intercepted, checking whether the operation is targeted at the downloaded file. If it is, then:
        Forwarding the request to the operating system;
        Decrypting the returned data and returning it to the calling program.
10. The method of embodiment 9, further causing file write operation requests sent from the controlled program to the computer's operating system to be intercepted, and
    Whenever a file write operation request is intercepted, checking whether the operation is targeted at the downloaded file. If it is, then:
        Encrypting the calling program's write data;
        Forwarding the request to the operating system;

[File Open/Save Dialog Substitution Methods and Systems, Stand Alone or in Combination with Other System and Methods Shown and Described Herein, Based on Conventional Technologies and/or in Accordance with any of the Following Embodiments Numbered 11 Onward:]

11. A computerized method of managing a computer program's operations, comprising:
    Causing file open and file save operation requests sent from the controlled program to the computer's operating system to be intercepted;
    Whenever a file open or file save class instantiation is intercepted, then:
    Substituting the file open or file save class with a private, own-made dialog,
    Pointing said dialog to display files from the user's cloud storage provider, using a cloud storage access token previously obtained through user's consent;
    Returning to the calling program the result of the remote enumeration operation;
12. The method of embodiment 11, where the file open and save operations are substituted by:
    Intercepting controlled application's calls to the operating system's CoCreateInstance API, replacing it with a substitution function;
    When said substitution function is called, determining whether the requested class instantiation is either the FileOpen or FileSave dialog, and if it is, then replacing the returned class object with a substitute dialog class object;

Said substitute file save or open class object's Show method is implemented to display remote cloud storage files by calling storage provider's enumeration functions, using the user's storage access tokens;

13. The Method of Embodiment 12, where Said Substitute File Save or Open Class Object's GetResult method is implemented so as to cause the remote file to be copied locally, and returns the user's selected file in a locally-accessible path;

[Connection of External Users Methods and Systems, Stand Alone or in Combination with Other System and Methods Shown and Described Herein, Based on Conventional Technologies and/or in Accordance with any of the Following Embodiments Numbered 11 Onward:]

14. A computerized method of managing a computer remote session operation, comprising:
    Providing a server for hosting application execution;
    Configuring a number of predefined user accounts with low security permissions on said server, where said user accounts are not tied to any specific real user,
    Whenever a remote user requests to start a remote session, finding an available user account not currently in use on said computer, allocating it for the remote session and marking it as unavailable for subsequent session requests;
    Generating a one-time password for said user account;
    Communicating the assigned user account identifier and temporary password to client component on the user's side, either directly or through an intermediate broker;
    causing the client component to connect to the server using said user account identifier and temporary password;
    Upon termination of the remote session, deleting the assigned user account's data and marking it as available again;

15. The method of embodiment 14, wherein the client component includes a Web program.

16. The method of embodiment 14, wherein the client component includes a mobile application.

17. The method of embodiment 14, wherein the session is limited in time.

18. The method of embodiment 14, wherein the session's programs are provided with virtualized storage as described in embodiment 1.

[Application Virtualization Provisioning Methods and Systems, Stand Alone or in Combination with Other System and Methods Shown and Described Herein, Based on Conventional Technologies and/or in Accordance with any of the Following Embodiments Numbered 19 Onward:]

19. The method of embodiment 14, wherein the user requests a specific virtual application to be used as part of his remote session, further comprising, before letting the user's session start:
    Provisioning the requested virtual application to the remote server;
    Upon start of the remote session, launching the virtual application and causing it to be rendered to the remote user.

[Cloud Storage-Based Remote App Invoking Methods and Systems, Stand Alone or in Combination with Other System and Methods Shown and Described Herein, Based on Conventional Technologies and/or in Accordance with any of the Following Embodiment 20:]

20. The method of embodiment 14, wherein sessions are started with a user-specified file to open as a parameter, and where:
    Upon session start, the server component downloads said file from the user's remote storage, using previously-acquired user storage access tokens; and
    The server-side component launches an application capable of handling the user's selected file according to the file's type;

[Remote Virtual App Packaging Methods and Systems, Stand Alone or in Combination with Other System and Methods Shown and Described Herein, Based on Conventional Technologies and/or in Accordance with any of the Following Embodiments Numbered 21 Onward:]

21. A computerized method for remotely creating virtual application packages, comprising:
    Taking a first initial snapshot of a computer server's files;
    Waiting for software installation package to be sent by a remote user;
    Upon reception of an installation package, executing that installation program;
    Upon completion of the installation, taking a second snapshot of the computer server's files and comparing the second snapshot with the initial snapshot's files; and
    Generating a virtual application package from the difference between the second snapshot and the first one;

22. The method of embodiment 21, further comprising:
    Defining a list of known installation builders, each with their known predefined command-line arguments for unattended installation mode;
    Upon reception of the installation package and before executing it, checking the installation package to determine if it was built with a known installation builder. If it was, then executing it in unattended mode, using said predefined command-line arguments.

23. The method of embodiment 22, further comprising:
    If the installation package was not built with a known installation builder, then executing it and generating a temporary password for remote connection into the computer, and
    causing the remote user to connect into the computer and conduct the installation to its completion.

24. The method of embodiment 21, further comprising:
    Upon reception of the installation package, executing it and generating a temporary password for remote connection into the computer, and
    causing the remote user to connect into the computer and conduct the installation to its completion.

It is appreciated that all of, or any suitable subset of, the following components may be combined as appropriate for specific use-cases and applications: Storage virtualization methods and systems; File open/save dialog substitution methods and systems; Connection of external users methods and systems; Application virtualization provisioning methods and systems; Cloud storage-based remote app invoking methods and systems; and Remote virtual app packaging methods and systems.

It is appreciated that for all systems shown and described herein, some or all components may be provided; and for all methods shown and described herein, some or all of the described operations in the method may be provided.

DETAILED DESCRIPTION OF CERTAIN EMBODIMENTS

The first embodiment of the present invention describes how to provide remote cloud storage to traditional software programs, making it appear as local storage in a local directory. First, an application is launched. It can either be a local application, an application launched on a remote server, a virtual application, or a virtual application launched on a remote server.

It is assumed that the system shown and described herein has access to the user's remote storage, either cloud storage or NAS or LAN storage. Cloud storage services such as Dropbox, Box, Google Drive and OneDrive each provide APIs with functionality allowing $3^{rd}$-party applications to obtain access tokens to the user's cloud files. We will refer to those as "remote storage access tokens".

Figure 1:
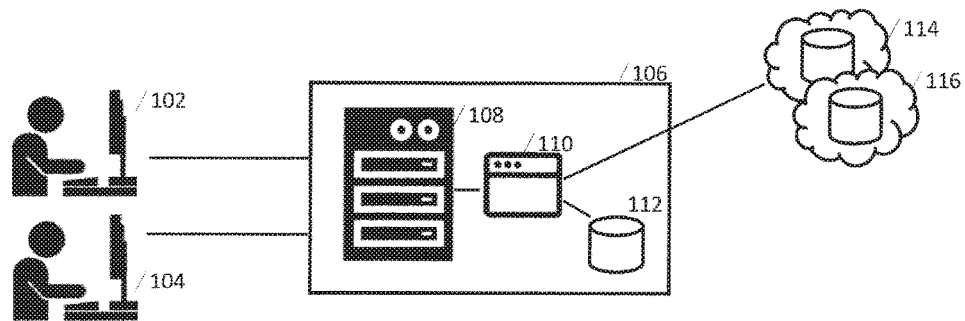
FIG. 1 is an overview of an environment for certain embodiments of the present invention.

FIG. 1 shows a perspective view of certain embodiments of the present invention within one possible environment. 102 and 104 represent users of remote applications. Remote applications can be accessed through remote access protocols such as RDP or VNC. Remote access can be accomplished through native applications on the client side, or even through a browser using HTML5 technology. 106 represents the location of the server where the remote application actually executes, typically a datacenter or server room. There can be one or multiple server locations, and they can optionally be accessed through techniques such as load-balancing. 108 is the actual server and CPU. 110 represents one or multiple applications which the user wishes to use. 112 is the local storage e.g. either a local or LAN hard drive. 114 and 116 represent the users' personal remote storage.

Figure 2:
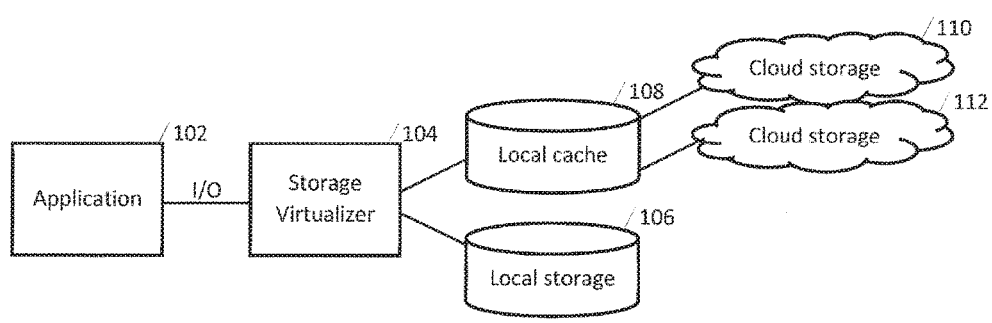
FIG. 2 is a schematic view, showing an interaction between an application and local and remote storage.

FIG. 2 shows a schematic view of an interaction between the application and local and remote storage, as orchestrated by certain embodiments of the present invention. 102 is the application issuing file I/O request to the operating system. 104 is functionality intercepting said I/O requests and deciding whether to redirect those to local or remote storage. 106 is the local storage. 108 is a local cache as provided by certain embodiments of the present invention. 110 and 112 represent the user's remote storage sources.

Certain embodiments of the invention define an arbitrary local path name as the user's entry point into the virtual storage, through which both the user and its application view the cloud storage data contents. As an example, this can be defined as "C:\Dropbox". We will refer to this as "entry-point directory". There may be multiple entry-point directories into different storage providers at the same time within a single session. In an embodiment of the invention, this directory does not exist. We will refer to the parent directory of an entry-point directory as the "parent of entry-point directory". For example, the parent of the entry-point directory "C:\Dropbox" is "C:\".

The operating system's APIs related to file input/output may be intercepted by using one of the various methods known to those skilled in the art. Such methods include user-mode API hooking, native API hooking, file system mini-filters. Each of the above hooking methods has its own advantages and preferred scenarios. These hooks can function at a system global level, or just for a specific application and its sub-processes. I/O APIs that are intercepted may for example include at least directory listing and file opening. On Microsoft Windows operating systems, file/directory listing can be intercepted by hooking the user-mode APIs FindFirstFile/FindNextFile, or by hooking the user-mode native APIs NtQueryDirectoryFile, or at the Kernel level by filtering calls to IRP_MJ_DIRECTORY_CONTROL. Similarly, file/directory openings can be intercepted by hooking the user-mode APIs CreateFile, or by hooking its user-mode native APIs equivalent NtCreateFile, or at the Kernel level by filtering calls to IRP_MJ_CREATE.

Virtual Storage Root

For improved convenience and ease of use, certain embodiments of the present invention make the entry-point directory appear to the user and his applications by intercepting file/directory listing. Whenever a listing is performed on the parent of an entry-point directory, certain embodiments of the invention causes the entry-point directory's name to be added to the list returned by the operating system. For example if the entry-point directory is "C:\Dropbox", then whenever the application requests a listing of the parent directory "C:\", certain embodiments of the invention may simulate an additional "Dropbox" to that list. There are various ways for achieving this. One example is by intercepting the FindFirstFileEx API and inspecting its lpFileName parameter. If lpFileName refers to the entry-point's parent directory (i.e. "C:\"), then we keep track of its returned handle, and monitor consequent calls to the FindNextFile API. Whenever the FindNextFile API is called with the same handle and returns ERROR_NO_MORE_FILES (marking the end of the file listing), we return the name portion of the entry-point directory (i.e. "Dropbox") with a success code. The subsequent call to FindNextFile may then return ERROR_NO_MORE_FILES to mark the end of the file listing. We have thus shown how to make the entry-point directory appear to an application and its user as if there was such local directory. The next operation is operative to simulate the contents of this directory. In a secondary embodiment of the invention, the entry-point directory can be pre-created on the hard drive so as to avoid simulating it.

Figure 3:
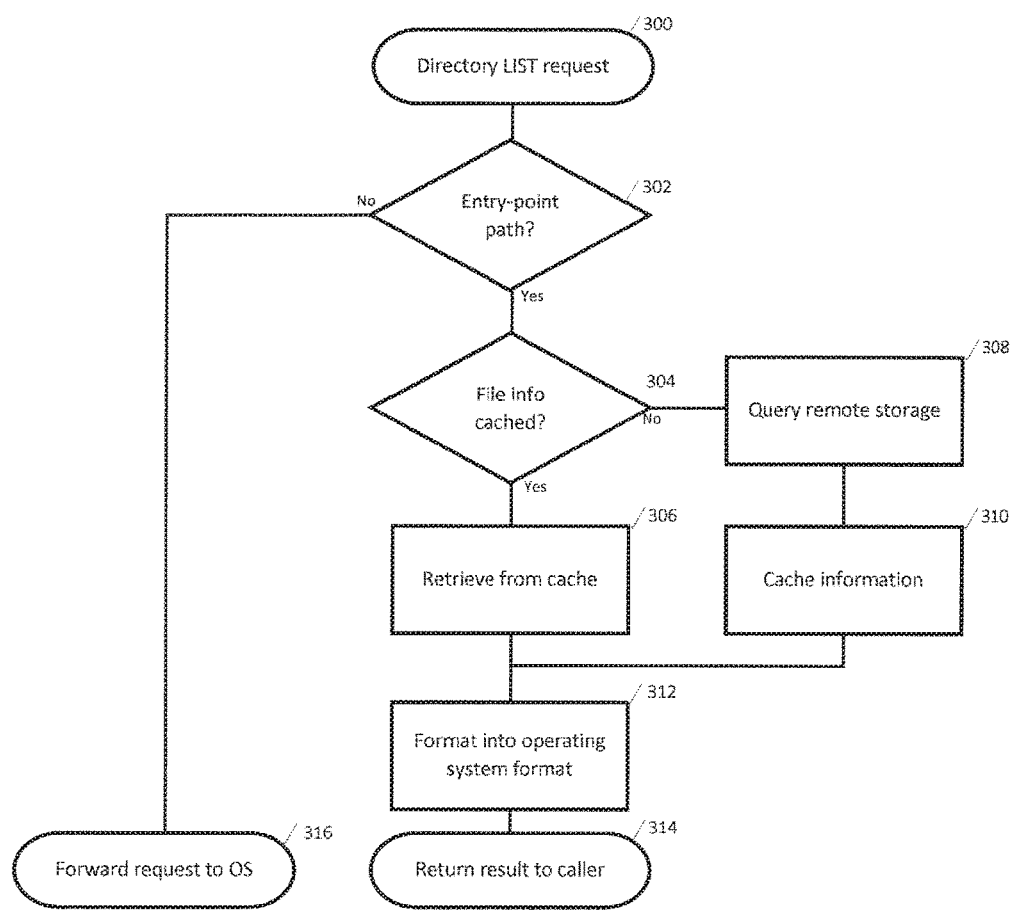
FIG. 3 is a flowchart of directory listing request made by a controlled application.

FIG. 3 describes the process of directory listing API interception. In 300 we intercept a directory listing operation. In 302 we check if the operation relates to a path inside the entry-point directory. For example, an operation requested on "C:\Dropbox" or "C:\Dropbox\Subdir" relates to a path inside the entry-point directory, while an operation requested on "C:\" or "C:\Documents" does not. If the operation does not relate to a path inside the entry-point directory, we proceed to 314 and let the operating system handle the request without further intervention. If in 302 the operation does relate to a path inside the entry-point directory, we continue to 304. In 304 we check whether we've already cached the directory's contents from the remote storage. If we did, we extract that information in 306. If we did not cache it yet, we proceed to 308. In 308, we access the remote storage provider using the storage keys and retrieve the corresponding directory's contents. We query the remote storage provider for the remote directory's contents. Typically, the remote directory's name is equal to the locally-requested path name from which we remove the entry-point directory's portion. For example, if the local call is requested for "C:\Dropbox\Subfolder" then the equivalent remote directory is "\Subfolder". If it is directed at "C:\Dropbox\" then the equivalent remote directory is "\". Different storage providers have different APIs for accessing user's contents. In this description we assume that the user has already authorized our program for accessing his remote storage contents. Once the remote storage provider has returned to us the listing of the user's remote files, we add that information to the cache in 310 so that following requests will behave faster thanks to 304 and 306. In 312 we add the resulting listing to the API's output data. For example if the intercepted API is FindNextFile, we fill-in the API's output data structure WIN32_FIND_DATA. Hence we convert the data returned from the remote storage provider's format into the format required by the intercepted function. An example of performing such conversion is described below. In 314 we return to the caller and finish.

Figure 4:
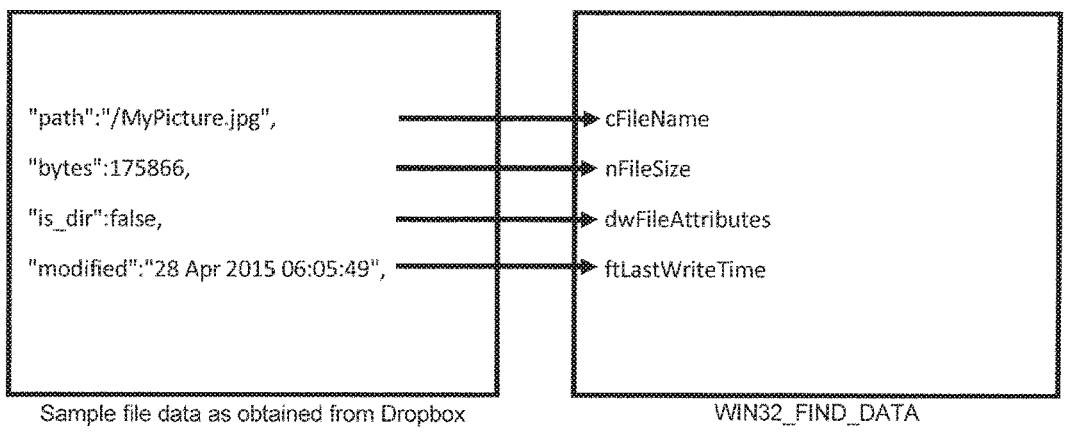
FIG. 4 is a representative view of format conversion from cloud storage provider's format to a local operating system's format.

FIG. 4 shows an example of converting remote storage provider's data into a local operating system format. In this example, Dropbox returned a directory listing in JSON format. It contains a file named "MyPicture.png" whose size is 175866 bytes. Data matching to Windows' WIN32_FIND_DATA (the data structure required by Windows' listing APIs FindFirstFileEx/FindNextFile) is shown with arrows and is self-explanatory. Irrelevant data has been removed for clarity.

Figure 5:
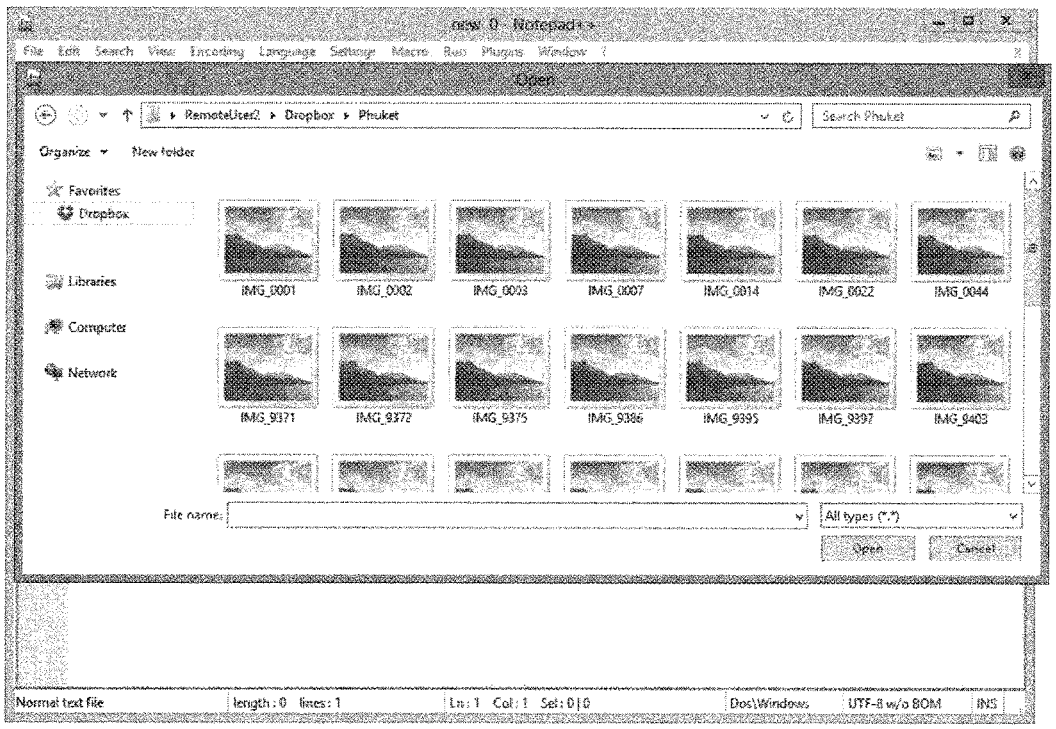
FIG. 5 is a screenshot illustrating a way an application and user may see a remote directory's contents through listing API interception.

FIG. 5 shows an example screenshot resulting from the above method. The application "sees" the contents of the virtualized directory is it were local.

Figure 6:
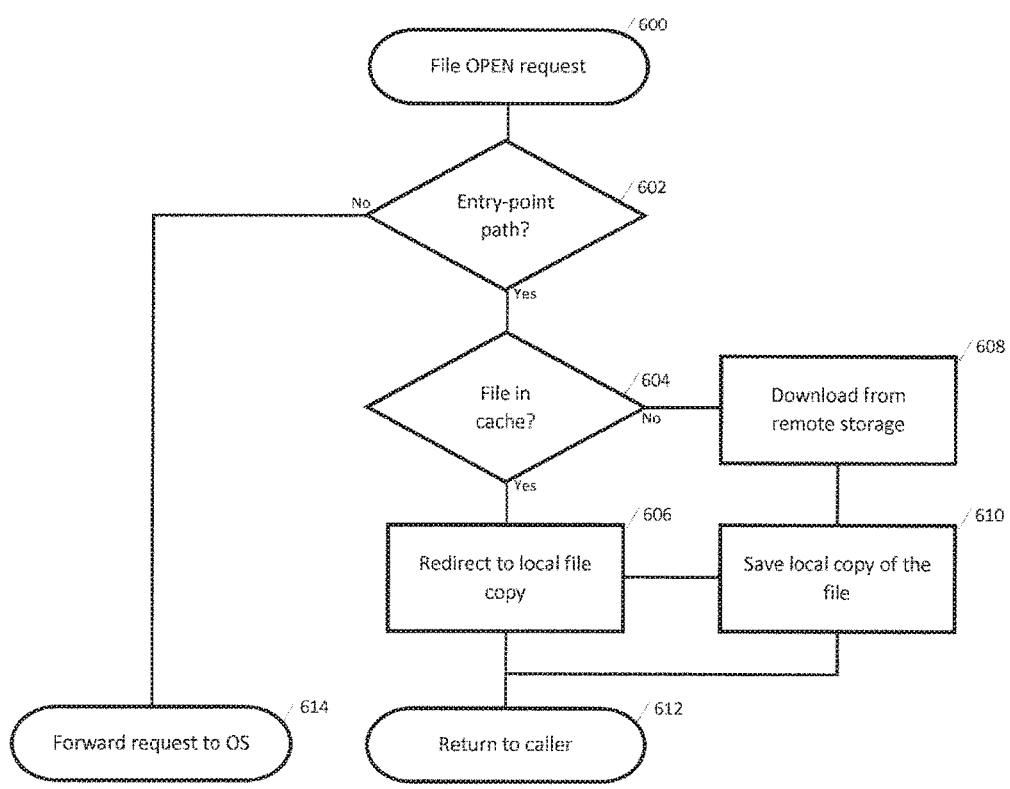
FIG. 6 is a flowchart of file open request made by a controlled application.

FIG. 6 describes the process of file opening API interception. In 600 we intercept a file open operation. In 602 we check if the operation relates to a path inside the entry-point directory. For example, an operation requested on "C:\Dropbox" or "C:\Dropbox\Subdir" relates to a path inside the entry-point directory, while an operation requested on "C:\" or "C:\Documents" does not. If the operation does not relate to a path inside the entry-point directory, we proceed to 614 and let the operating system handle the request without further intervention. If in 602 the operation does relate to a path inside the entry-point directory, we continue to 604. In 604 we check whether we've already downloaded the file's contents locally. If we did, we proceed to 606 where we modify the file open's requested path to point to the local copy of the downloaded file. For example if we've already downloaded the file into "C:\LocalCache\MyPicture.png", then we modify the file open request input parameter to "C:\LocalCache\MyPicture.png" and forward the request to the operating system. We then return the return code (i.e. "success") to the caller in 612. In 604 if we haven't yet download the file before, we proceed to 608. In 608, we access the remote storage provider using the storage keys and request to download the remote file. We query the remote storage provider for the file's contents. Typically, the remote file name is equal to the locally-requested path name from which we remove the entry-point directory's portion. For example, if the local call is requested for "C:\Dropbox\MyPicture.png" then the equivalent remote directory is "\MyPicture.png". In 610 we save the obtained file's contents into a local cache directory. One possible embodiment of the invention may set an expiration time for the downloaded file so as to delete it from local storage after some time thus forcing to re-fetch it if ever the remote version of the file gets modified. The timeout period can start ticking from the moment the file is no longer in use. For example, on Windows platforms it is possible to determine if a file is in use or not, by using the RestartManager API set, and specifically the RmGetList API, or alternatively by starting to count elapsed time from the moment the file's last handle is closed. When such expiration time is reached, the file can be deleted from the local cache. This additional operation also improves data security, because it eliminates files that are not in use from the server, keeping only a few set of files at any given time. Cloud storage providers typically provide APIs for tracking remote file change, and this can also be used for deciding when to discard local file's copy when it becomes outdated compared to its remote version, for example in collaborative work scenarios when different users work on remote files at the same time. In 612 we return the operating system's return code of the modified open request (i.e. "success"). In an embodiment of the invention, all files that were cached locally may be deleted from the server when the user's remote session is ended. Because certain embodiments of the present invention are minimalist in terms of downloaded data, the cost for re-downloading the necessary files during subsequent sessions is negligible.

Figure 7:
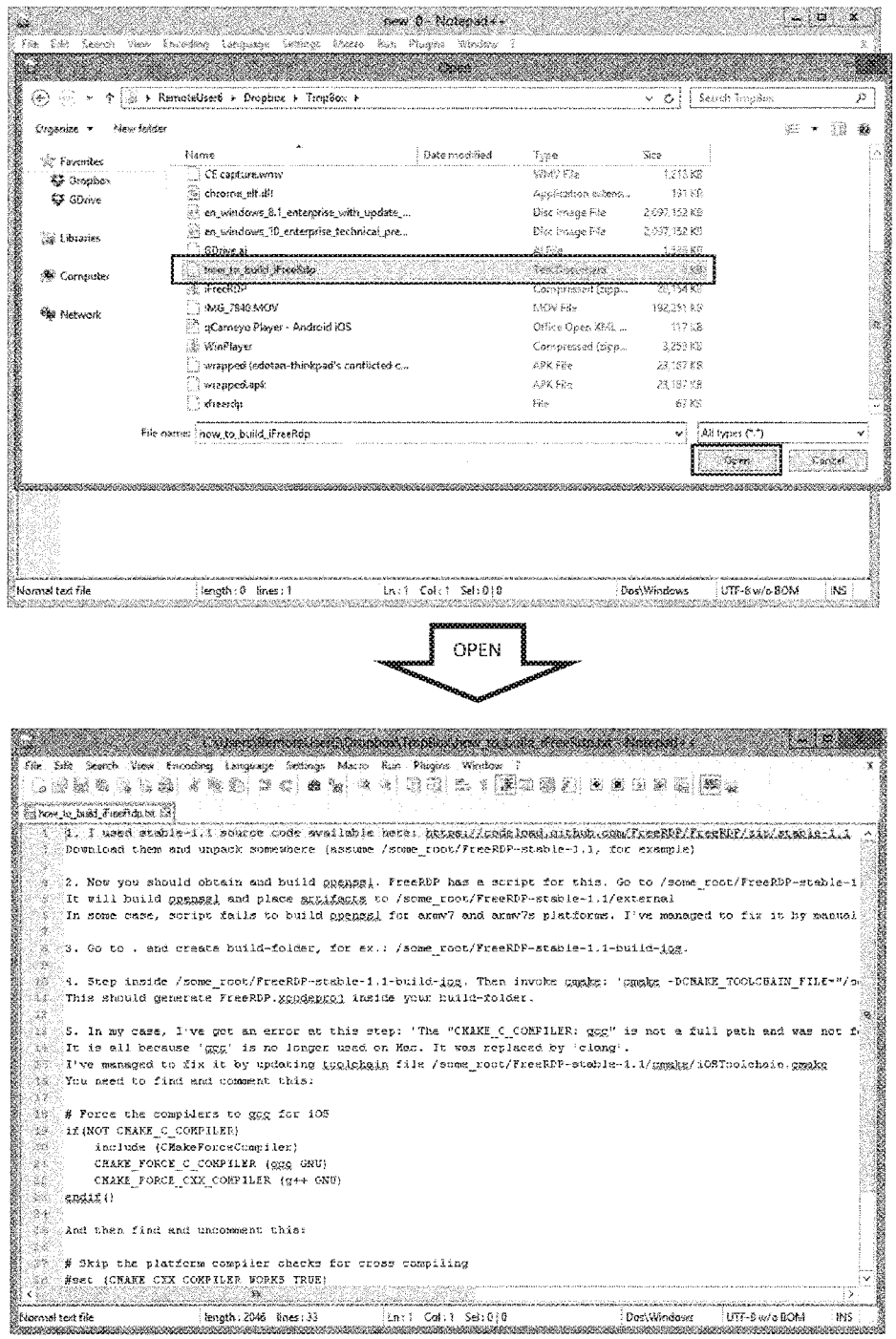
FIG. 7 is a series of two screenshots illustrating a user's workflow when opening a remote file.

FIG. 7 shows an example screenshot resulting from modifying file open operations as described above. An application named "Notepad++" opens a file named "how_to_build_iFreeRDP.txt" inside the entry-point directory "Dropbox", at which point this file is downloaded in real-time from the user's Dropbox into a locally-cached file (unknown to the application) and the file open operation is then pointed to the local copy of the file and can be worked on as if it were a local file.

So far we have described listing and opening remote storage files in a transparent way. Now let us describe synchronizing local changes back to the remote storage. Indeed, when the user edits or modifies files opened from the remote storage, he expects those changes to be saved back to the remote storage. This is accomplished in two operations: a. change detection, b. uploading back to the remote storage. Uploading changes back to the remote storage can be done either asynchronously (in parallel, without blocking the application's workflow) or synchronously if the sequence in which data is modified is important. The asynchronous method may provide better application response time and also it is usually acceptable for users to see changes applied to the remote storage a few seconds after they are made locally. File changes made by the user may include: file modification (write), creation/overwrite, deletion, rename/move. Detecting change can be accomplished in any suitable manner. One method for change detection includes using operating system APIs. Microsoft Windows provides such an API named ReadDirectoryChangesW. This API can be pointed towards the local cache directory into which we cache remote storage files, thus triggering whenever the user modifies those files. When such change is detected, we either upload the new file's contents (in case of file modification) or mimic the file operation remotely (in case of file deletion/rename etc.) Change detection can also be accomplished by hooking additional file I/O APIs such as file write and/or file close. How to implement the second operation of uploading the file back to the remote storage is known to those skilled in the art.

Figure 8:
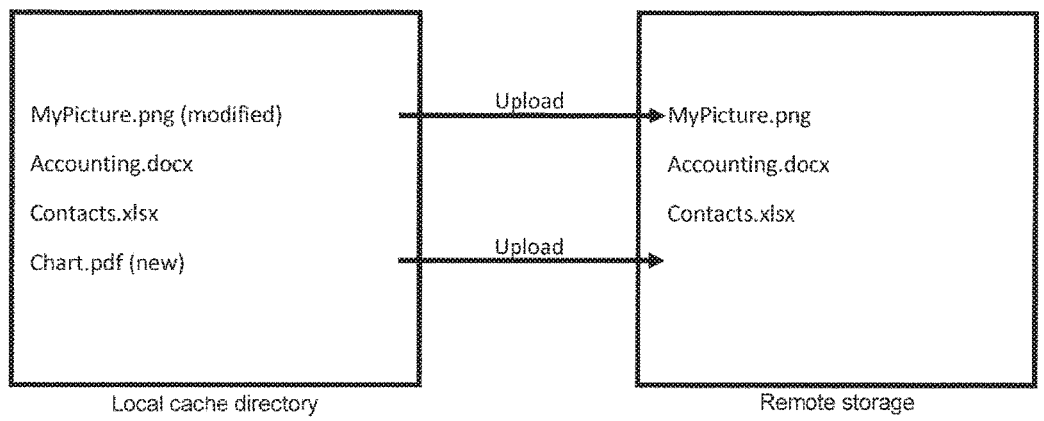
FIG. 8 is a representative view that exemplifies file modification synchronization.

FIG. 8 shows an example of synchronizing changes back to remote storage and is self-explanatory.

Encryption

Figure 10:
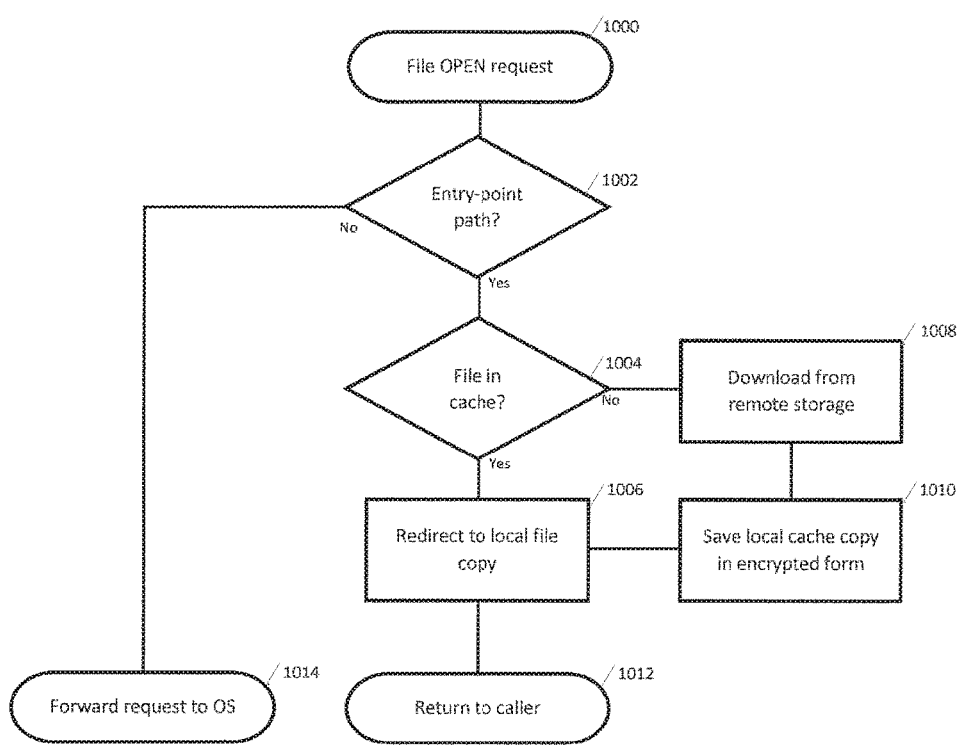
FIG. 10 is a flowchart of file open request made by a controlled application, including data encryption.
Figure 11:
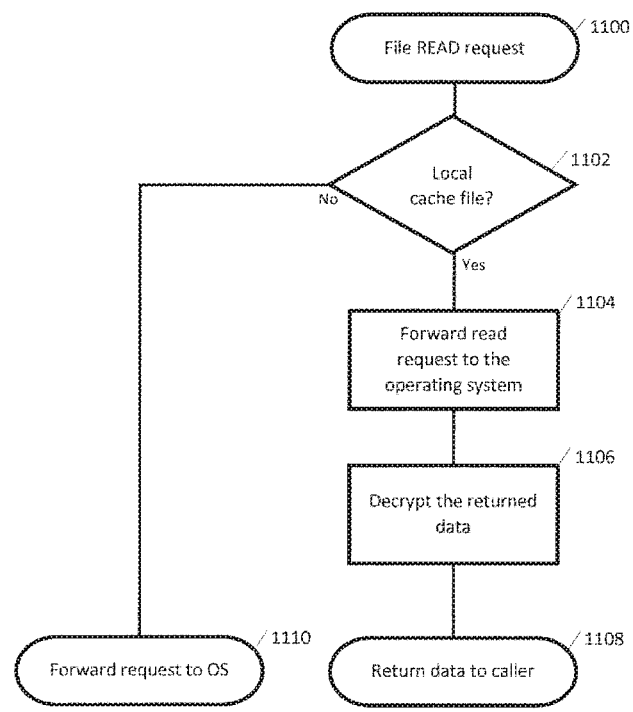
FIG. 11 is a flowchart of file read request made by a controlled application, including data decryption.
Figure 12:
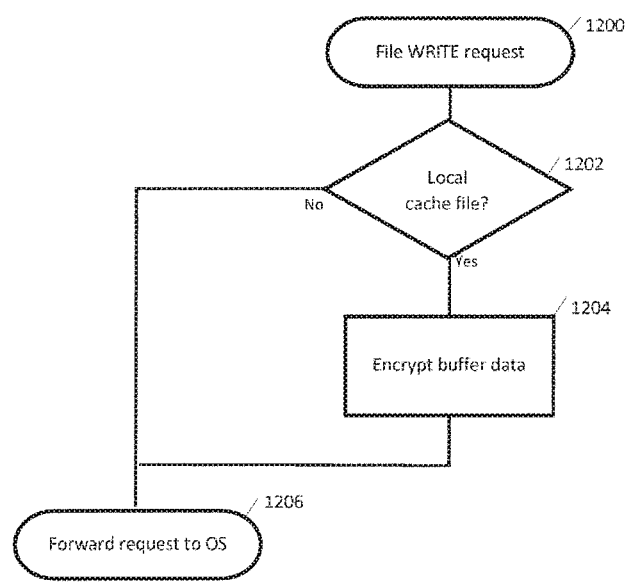
FIG. 12 is a flowchart of file write request made by a controlled application, including data encryption.

The local cache directory can be encrypted for protecting data-on-rest against unauthorized access. FIGS. 10, 11 and 12 describe the additional operations which may be used for encrypting the locally-cached data.

FIG. 10 is similar to FIG. 6, except in 1010 where the local cache file copy is saved in encrypted form. Saving a file in encrypted form is known to those skilled in the art. Since the requesting program has now obtained a handle to the encrypted copy of the file, we also may implement a real-time encryption/decryption mechanism allowing it to read and write data. To this end, file read and file write I/O APIs may be intercepted. On the Windows operating system, this can be achieved by intercepting the ReadFile and WriteFile APIs for example. FIGS. 11 and 12 describe the mechanisms for providing programs with a transparent way of working with encrypted copies of the cached files.

FIG. 11 describes the real-time decryption process for file read requests made on encrypted cached files, so as to show the requesting program a plain unencrypted view of the file. In 1100, a file read operation is intercepted. On Windows operating systems this can be done by hooking APIs such as ReadFile. In 1102 it is checked whether the read operation targets a locally encrypted cached file. On most operating systems, file read requests are made with a file handle as input parameter. Such handle is obtained when opening the file, and is kept valid until the file is closed. Hence one way of keeping track of which files are local cached files and which are not, can be by keeping a list of cached files handles, gathered whenever local cache files are opened, upon the file open API (which was described in FIG. 6). If the file being read is not a local cache file, the process continues to 1110 where the request is simply forwarded to the operating system. If in 1102 the file is a local cache file, we proceed to 1104 where the request is transmitted to the operating system. Then in 1106 the returned read data is decrypted. The decryption key may have been stored in any suitable manner, typically obtained from a server upon session start. In 1108 the decrypted data is returned to the caller.

FIG. 12 describes a real-time encryption process for file write requests made on encrypted files. In 1200 a file write request is intercepted. On Windows operating systems this can be done by hooking APIs such as WriteFile. In 1202 it is checked whether the operation targets a locally encrypted cached file. If it isn't, we proceed to 1206 where the request is directly forwarded to the operating system. If it is, we proceed to 1204 where the buffer provided by the caller is encrypted before the request is forwarded to the operating system in 1206.

Figure 13:
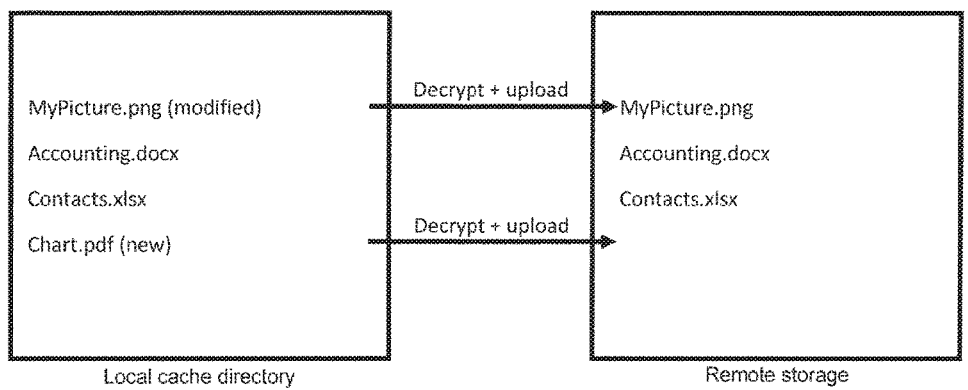
FIG. 13 is a representative view that exemplifies file modification synchronization for encrypted data.

FIG. 13 is similar to FIG. 8, except files are decrypted before they are uploaded back to the remote storage.

Optimization and Predictive Caching

Local caching of remote files can be improved by implementing predictive caching, so as to further improve user experience and make files ready to use when the user is about to open them. As an example, the root directory of the remote storage can be cached in parallel when the user's session begins, hopefully before the user even accesses the entry-point directory. This way, when the user accesses this directory it is already cached, thus eliminating the time required for querying the remote storage. Also, as soon as the user accesses the entry-point's directory or one of its sub-directories, it is possible to anticipate and pre-cache that directory's sub-directories, or even gather statistical data about which sub-directories or files are most frequently opened after which ones, and so on for internal directories. Predictive caching can be implemented as a tree data structure. Each time the user accesses a directory inside the entry-point directory, caching begins in parallel for its sub-directories.

Figure 9:
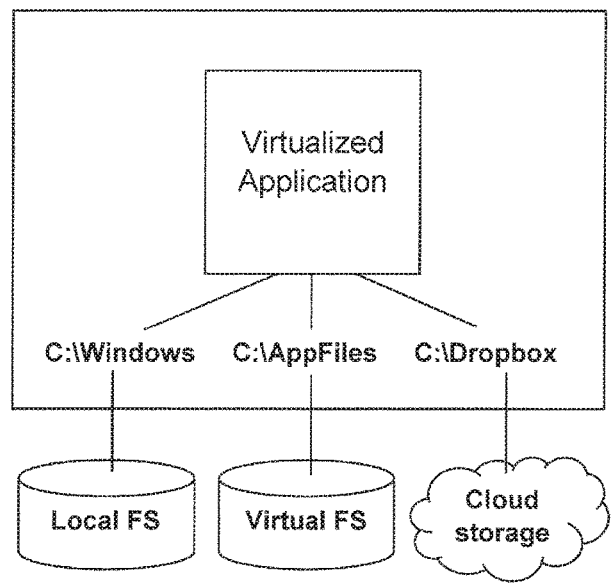
FIG. 9 is a representative view of certain embodiments of the present invention applied to virtual applications.

Certain embodiments of the present invention can be combined with virtual applications as shown in FIG. 9. In this example, a virtual application merges the view of the local system (i.e. C:\Windows directory) with the virtual application's files (i.e. C:\AppFiles directory) as part of a typical virtual application scenario. Combined with certain embodiments of the present invention, storage access is virtualized through an entry-point directory exemplified as C:\Dropbox.

File Open/Save Dialog Substitution

So far we've described simulating to programs file's presence and redirecting local paths to cloud storage. It may be beneficial to transform the application's file dialogs so as to improve the user's experience. Rather than displaying to the user the standard "File open" and "File save as" dialogs, we seek to display a custom dialog tailored for the scenario of cloud storage and remote applications. This can be achieved by hooking into the controlled application's system API calls and intercepting calls to standard file dialogs. Then, within our interception function, we can replace the dialog with our own dialog. On Windows, we can achieve this by intercepting API calls to the CoCreateInstance API and replacing this API with our own handler function. CoCreateInstance is an API on the Windows operating system, allowing applications to instantiate various system-wide class objects—both system-provided and third-party-provided. When our substitute CoCreateInstance function is called, we call the original CoCreateInstance API and check for success. If successful, and if the requested class ID (CLSID) matches that of CLSID_FileOpenDialog or CLSID_FileSaveDialog, we replace the returned class object with our own class object. Our own class object implements the standard file open or save dialogs, overriding the standard IFileOpenDialog and IFileSaveDialog class interfaces, both of which are public and documented by Microsoft. In our substitute class, we implement our own file UI, whose role is to display remote cloud storage files rather than local ones. This can be either combined with the above storage virtualization method by directing our dialog's path to the entry-point directory (i.e. "C:\Dropbox"), or by having the dialog itself communicate with the cloud storage provider and directly display the files from there. This custom display is implemented within the class' Show( ) method. There, we display our own dialog. When the user is done selecting their file, we memorize his selection so as to return it to the user when the standard GetResult( ) method is called by the application. Additionally, we typically make the file locally-accessible to the application, as applications cannot directly access cloud storage files through the usual file APIs. One method is to copy the file locally—either at the time the user selects the file within the file dialog, or later when the GetResult( ) method is called. Such file copying can either be performed explicitly by the custom dialog at those times, or it can be combined with the storage virtualization method described earlier, in which case file copying may take place automatically when the controlled application tries to access the local path name, because we reference a path to the entry-point directory (i.e. "C:\Dropbox").

Remote App Sessions for Unmanaged Users

Certain embodiments of the present invention reduce dependency on server-based storage and thus operating-system user profiles and user accounts. This can be leveraged for dissociating remote execution sessions from operating system accounts. Typically, operating systems require users to log in with their enterprise account credentials (e.g. LDAP/Active Directory logins), including for remote sessions. This is somewhat less flexible in cloud scenarios where users may be external to the company, and with little to no trust relationship between the users and the company or provider. For example, a software publisher may want to rent the use of his software to Internet users on an hourly basis. By providing users with the ability to connect remote sessions to any external storage provider, certain embodiments of the present invention opens the door to a new kind of remote session scenarios. Remote session servers can be configured to with a given number of arbitrary user accounts, named for example "RemoteUser1", "RemoteUser2" . . . "RemoteUser50". The software publisher's front-end application can then connect registered or anonymous users to any user account currently available on the remote server. RemoteUser accounts are initialized for a one-time use, and are trashed and recycled upon user's session termination. Indeed, certain embodiments of the invention make user sessions completely independent of local data and hence user accounts. By simply using the user's remote storage credentials, operating system's accounts can be recycled from one session to another, while users still keep access to their personal data in a persistent manner, since it is kept in a remote storage.

Figure 14:
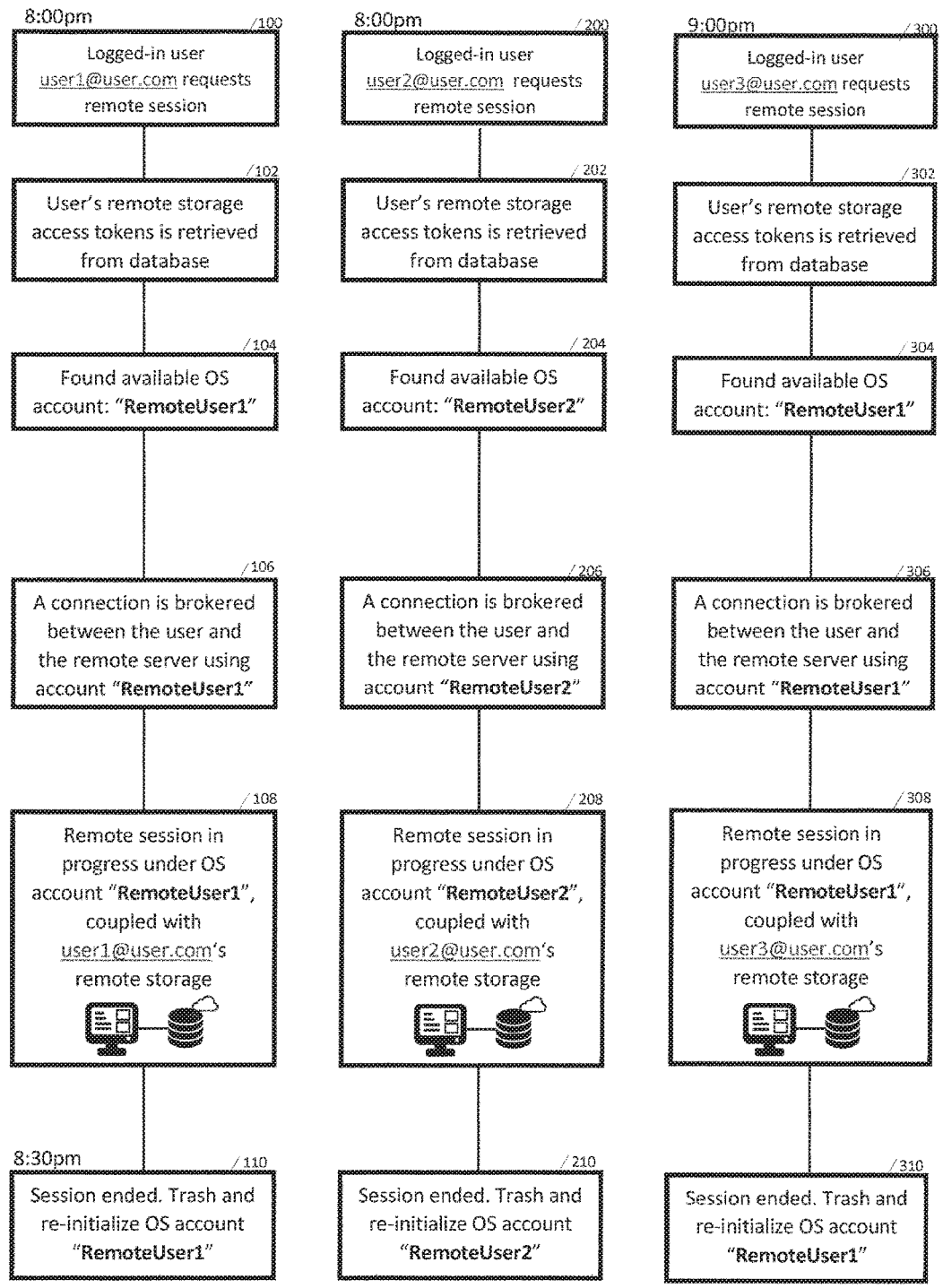
FIG. 14 is a flow diagram representing three separate application session requests by external users.

FIG. 14 illustrates remote sessions' lifecycles, removing the tie between Internet users and individual operating system user accounts. By way of example, at 8:00 pm, say, two (say) separate Internet users connect to a front-end application designed around certain embodiments of the present invention: user1@user.com and user2@user.com. The front-end application finds an available OS user account for each of them: respectively "RemoteUser1" and "RemoteUser2". The front-end application brokers a remote application session for each, and marks those OS user accounts as "in use". At 8:30 pm, the sessions are ended. The OS user accounts are then trashed and re-initialized, and these OS user accounts ("RemoteUser1" and "RemoteUser2") are marked as "available" again. At 9:00 pm, a third user user3@user.com requests a remote session. The application finds "RemoteUser1" as available again, and brokers the remote session. Since each user session is coupled with their own cloud storage using the storage virtualization mechanism, it makes no difference to the users which OS user account they are running on, as they are each connected to their personal remote storage and can see and work on their personal cloud files. Hence we have shown how to make use of a number of concurrent users on a given server, without tying those users to organization credentials or to OS-level accounts. Following is the detailed workflow of FIG. 14's operations 100 through 110: in operation 100, an authenticated Internet user named user1@user.com requests to start a remote session over the Internet or LAN. In 102, the system retrieves the user's remote storage access token. It is assumed that those access tokens were already obtained and saved by the system; obtaining and saving such user tokens is a well-known technique, described by well-known protocols such as OAuth2. In 104, the system looks for an available OS account on the remote server. The list of available/occupied user accounts can be maintained in different ways, using any suitable known implementation. In 104 the system determines that the OS account "RemoteUser1" is available for use. The server generates a random one-time password for remotely connecting into this user's account and communicates it to the relevant component. In 106 the system uses the login name "RemoteUser1" in combination with the one-time password and either brokers a connection between the client and the server, or simply transmits the connection parameters to the client and lets it connect into the server. In the latter case, a limited time period is allowed for the client during which it can connect so as to minimize abuse. In 108, a remote session is in progress. Remote session can be provided by any proprietary or standard protocol, such as VNC or RDP. In 110, when the session is finished or terminated, the OS account profile is destroyed and e-initialized for the next user. In many applications and use cases, it is important to destroy all traces of the ending session, so as to remove any private elements from this user's session to the next. This can be achieved for example by requesting the OS to delete this user's account and then recreate it again from scratch.

In an embodiment of the invention, the remote execution's remote user accounts are limited user accounts and their ability to modify global system elements is locked-down or limited. Additional sandboxing techniques can be installed so as to further enforce separation between the different user sessions. Remote user sessions are typically separated in terms of files, memory, registry, and processes so as to avoid data leakage between simultaneous users. Securely separating user sessions between each other may be achieved by any suitable known method such as but not limited to enforcing access permissions using a file-system filter driver.

Cloud Storage-Based Remote App Invoking

Remote application session and remote application storage access can be combined in various ways. In one possible embodiment, the user is presented with his remote file storage contents before any remote application session is started. Then, when he selects a file, for example "MyFile.docx" on his Dropbox folder, the application looks up the server's available applications best fit to deal with the selected file type (in this example "docx"), and initiates a remote application session as described above. As the session starts, the server-side deploys the user's selected file ("MyFile.docx" for example) on the server-side, and instructs the server-side application to open it. Thus we save the user from having to select file to open through the remote session, letting him instead select the file before the session starts, thus in a more streamlined UI workflow.

Application Virtualization Provisioning

The invention can be further extended by leveraging application virtualization. The mechanism described above provides external users with empty OS accounts and profiles for each session. However, instead of offering users a blank configuration or even a set of pre-installed applications on the server, it is possible to dynamically provision different applications for each session. This can be accomplished by using application virtualization techniques. Application virtualization is a well-known technique allowing applications to be transported between computers without having to be pre-installed. Virtual applications may be provisioned and started when the user's session is being prepared on the server, before user is effectively connected to his session.

Figure 15:
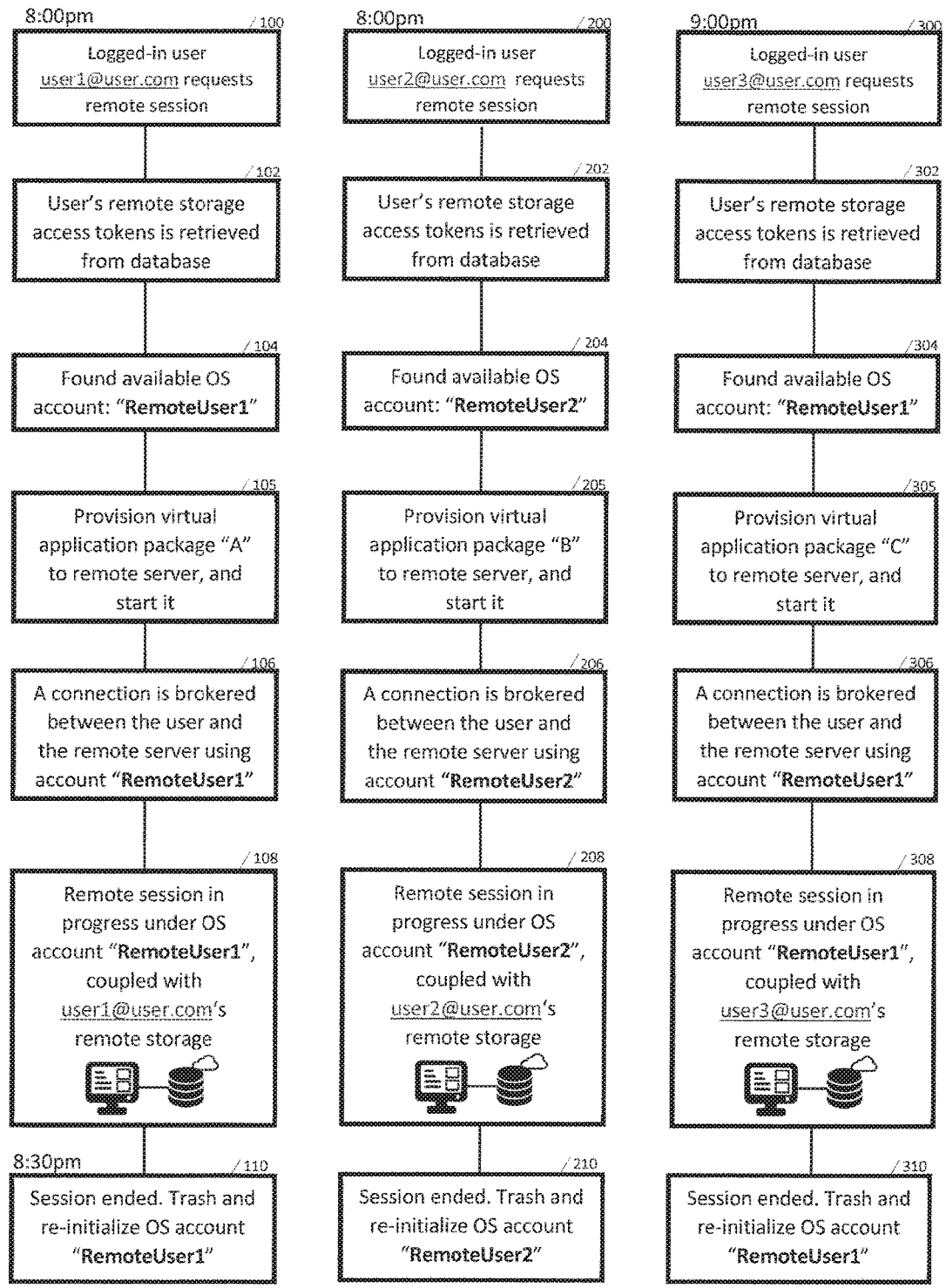
FIG. 15 is a flow diagram representing three separate application session requests by external users, with dynamically-provisioned applications.

FIG. 15 is similar to FIG. 14, but with the additional operations 105, 205, 305. In these operations, each user session is provisioned with the user's relevant application. Provisioning virtual applications can typically be accomplished by copying an application "package"—a single file containing the entire application's contents. The virtual application is either started directly, or made to be started using the remote access protocol's configuration or commands.

Remote Virtual Application Packaging

The process can be further enhanced by allowing users not only to use virtual applications remotely, but also to create these applications remotely, requiring nothing more than a browser. Virtual application packages are typically built through a method of pre- and post-snapshots. Existing virtual application products capture (sequence) a package by taking a pre-snapshot of the computer's files and registry prior to said application's installation. After installation is finished, a post-snapshot is taken. The packager (or "sequencer") then compares the post-snapshot with the pre-snapshot and produces a package containing the differences. Newly-created or modified files and registry keys are saved into this package. The package's format can be either proprietary or standard (e.g. ZIP). The package contents are then used in combination with the application virtualization product's engine to provide a merged view for virtual applications of both the packaged components (the virtualized application's components) and the local system. This method is known those skilled in the art. Let us now describe remote packaging methods through a browser in both manual and automated ways, which the users can then use along with virtualized storage, using the methods previously described herein.

Browser-Based Method for Manual Virtual Application Packaging Sessions

The following method enables a user to package a virtual application using a browser, through a remote server. The packaging tool is assumed to be already present and configured on the server and takes a pre-snapshot of the server in its clean state. It is then marked as available and awaiting for incoming remote access connections through remote access protocols such as RDP or VNC. On the client side, a web client for those access protocols establishes connection to the packaging server. Web clients exist nowadays for all major remote access protocols, and are typically written in HTML5 and JavaScript languages. Whenever a remote connection is established—either directly or through a broker such as the one described in FIGS. 14 and 15—the user can then install the application they wish to package. For example, the user can control the remote server to download an installer file from some URL and the user can then launch that installer and execute the installation and configuration of said software. At the end of the process, the user indicates to the server that he is done. The server then takes a post-snapshot and generates a virtual application package. The package can then be tested or used, including through the browser, using the methods described in FIGS. 14 and 15. The server can then either terminate the remote connection or let the user test the package first before disconnecting. Either way, at the end of the session, the remote machine (typically a virtual machine) is restored to its initial state so as to be ready for further packaging sessions.

Automated Application Virtualization Packaging

The same process can be automated for a majority of applications. Many installers support an unattended installation mode (sometimes called silent installation mode). Installation programs are generally produced by installation builders, such as Windows Installer (MSI), InnoSetup, InstallShield, etc. Most installation builders include their own unattended mode installation mode command lines. For example, to install an MSI file in unattended mode, it may be launched with command-line parameter "/qn". Hence the current process of automation includes the following: as described above, a remote server has had its pre-snapshot taken. It is ready to receive incoming packaging requests. Packaging requests are simply an upload (or URL) of an installer file that may be used on the remote server side. When a request arrives, the server obtains the installer file and analyzes with which installer builder it was produced. Hence it is tested against a list of installer builders. That list also includes a list of known unattended mode command-lines. If the request's installer was built with a known installation builder that supports unattended installation mode, the installer is launched with the known unattended command-line parameters. In that case, and upon successful installation (typically indicated by the installer's exit code), the remote server automatically triggers the post-snapshot operation and finalizes the virtual package. At this point, a virtual package was automatically built without user intervention. If the installer was not built with a known installer builder or with an installer builder supporting unattended mode, or if the installation did not proceed successfully, it is possible to then fall back to a manual packaging process as described above, and let the user manually control the installation of the application.

Features of the present invention, including method steps, which are described in the context of separate embodiments may also be provided in combination in a single embodiment. Conversely, features of the invention, which are described for brevity in the context of a single embodiment or in a certain order may be provided separately or in any suitable sub-combination or in a different order.

Any or all of computerized sensors, output devices or displays, processors, data storage and networks may be used as appropriate to implement any of the methods and apparatus shown and described herein.

The invention claimed is:

1. A computerized method of managing a computer program's operations, comprising:
  defining an arbitrary directory path on a local computer;
  causing file enumeration operation requests sent from the controlled program to the computer's operating system to be intercepted; and
  whenever a file enumeration operation request is intercepted, checking whether the enumeration is targeted at said arbitrary directory path or a subdirectory thereof;
  if it is, then:
  initiating a file enumeration request on a remote storage; and
  returning to the calling program the result of the remote enumeration operation,
  wherein data modifications made on the local computer are uploaded back to the remote storage,
  where file open and save operations are substituted by:
  intercepting controlled application's calls to the operating system's CoCreateInstance API, replacing it with a substitution function;
  when said substitution function is called, determining whether the requested class instantiation is either the FileOpen or FileSave dialog, and if it is, then replacing the returned class object with a substitute dialog class object; and said substitute file save or open class object's Show method is implemented to display remote cloud storage files by calling storage provider's enumeration functions, using the user's storage access tokens.

2. The method of claim 1, wherein whenever a file enumeration operation request is targeted at the direct parent of said arbitrary directory path, then forwarding the request to the operating system and modifying the returned data so as to add the name of the arbitrary directory to the list.

3. The method of claim 1, wherein file information is cached, and wherein subsequent enumeration requests on the same path are retrieved from the cache without initiating another remote access request.

4. The method of claim 1, further causing file open operation requests sent from the controlled program to the computer's operating system to be intercepted, and whenever a file open operation request is intercepted, checking whether the opening is targeted at said arbitrary directory path or a subdirectory thereof; if it is, then:

initiating a file download request from a remote storage; and returning to the calling program the contents the locally-downloaded file.

5. The method of claim 4, wherein the remote file is downloaded to a local directory and the file open operation request is modified to point to the local copy of the file, and then forwarded to the operating system.

6. The method of claim 5, wherein the local copy of the downloaded file is monitored for changes, and wherein whenever a change is detected, duplicating that change back on the remote storage.

7. The method of claim 5, wherein the downloaded file is saved in encrypted form.

8. The method of claim 7, further causing file read operation requests sent from the controlled program to the computer's operating system to be intercepted, and whenever a file read operation request is intercepted, checking whether the operation is targeted at the downloaded file; if it is, then:

forwarding the request to the operating system; and decrypting the returned data and returning it to the calling program.

9. The method of claim 8, further causing file write operation requests sent from the controlled program to the computer's operating system to be intercepted, and whenever a file write operation request is intercepted, checking whether the operation is targeted at the downloaded file; if it is, then:

encrypting the calling program's write data; and forwarding the request to the operating system.

10. A computerized method of managing a computer program's operations, comprising:

causing file open and file save operation requests sent from the controlled program to the computer's operating system to be intercepted; and whenever a file open or file save class instantiation is intercepted, then:

substituting the file open or file save class with a private, own-made dialog;

pointing said dialog to display files from the user's cloud storage provider, using a cloud storage access token previously obtained through user's consent; and returning to the calling program the result of the remote enumeration operation, where the file open and save operations are substituted by:

intercepting controlled application's calls to the operating system's CoCreateInstance API, replacing it with a substitution function;

when said substitution function is called, determining whether the requested class instantiation is either the FileOpen or FileSave dialog, and if it is, then replacing the returned class object with a substitute dialog class object; and said substitute file save or open class object's Show method is implemented to display remote cloud storage files by calling storage provider's enumeration functions, using the user's storage access tokens.

11. The method of claim 1, where said substitute file save or open class object's GetResult method is implemented so as to cause the remote file to be copied locally, and returns the user's selected file in a locally-accessible path.

12. The method according to claim 10, further comprising a storage virtualization process in which a computer program's operations are managed as follows:

defining an arbitrary directory path on the local computer;

causing file enumeration operation requests sent from the controlled program to the computer's operating system to be intercepted;

whenever a file enumeration operation request is intercepted, checking whether the enumeration is targeted at said arbitrary directory path or a subdirectory thereof; If it is, then:

initiating a file enumeration request on a remote storage; and returning to the calling program the result of the remote enumeration operation.

13. The method according to claim 10, wherein data modifications made on the local computer are uploaded back to the remote storage in parallel, without blocking the application's workflow.

14. The method according to claim 10 wherein data modifications made on the local computer are uploaded back to the remote storage synchronously to preserve the sequence in which data is modified.

15. The method according to claim 1, wherein at least some data modifications made to said arbitrary directory are uploaded back to the remote storage.

16. The method according to claim 1, wherein at least one data modification made to at least one file in said arbitrary directory are uploaded back to the remote storage.

17. The method according to claim 13, wherein an arbitrary directory path is defined on the local computer thereby to define an arbitrary directory and wherein said data modifications include at least some data modifications made to said arbitrary directory.

18. The method according to claim 13, wherein an arbitrary directory path is defined on the local computer thereby to define an arbitrary directory and wherein said data modifications include at least one data modification made to at least one file in said arbitrary directory.

19. The method according to claim 1, wherein an arbitrary local path name is defined as the local computer's user's entry point into virtual storage, through which both the user and its application view cloud storage data contents.

20. The method according to claim 19, wherein, for at least one individual session, multiple entry-point directories into different storage providers exist at the same time within said individual session.

21. The method according to claim 1, wherein the method is configured to make an entry-point directory appear to the user and his applications by intercepting file/directory listing and wherein, each time a listing is performed on a parent of an entry-point directory, the method is configured to cause the entry-point directory's name to be added to a list returned by the operating system, and wherein the entry-point directory thus appears to an application and its user as if there was such local directory.

22. The method according to claim 1, wherein at least one directory listing request is made by a controlled application including directory listing API interception comprising intercepting a directory listing operation, checking if an operation relates to a path inside the entry-point directory and if not, letting the operating system handle the request without further intervention, checking, if the operation does relate to a path inside the entry-point directory, whether the directory's contents from the remote storage is already cached and, if so, extracting said contents as cached, accessing the remote storage provider using storage keys and retrieving the corresponding directory's contents if the directory's contents from the remote storage is not yet cached, querying the remote storage provider for the remote directory's contents, and, once the remote storage provider has returned the listing of the user's remote files, adding that information to the cache thereby to expedite future requests, adding the resulting listing to the API's output data, thereby to convert data returned from the remote storage provider's format into a format required by the intercepted function, and returning to the caller.

* * * * *